May 28, 1963  J. T. McNANEY  3,091,698
PHOTOSENSITIVE LIGHT AMPLIFIER AND REGENERATIVE ELEMENT
Filed Aug. 10, 1961
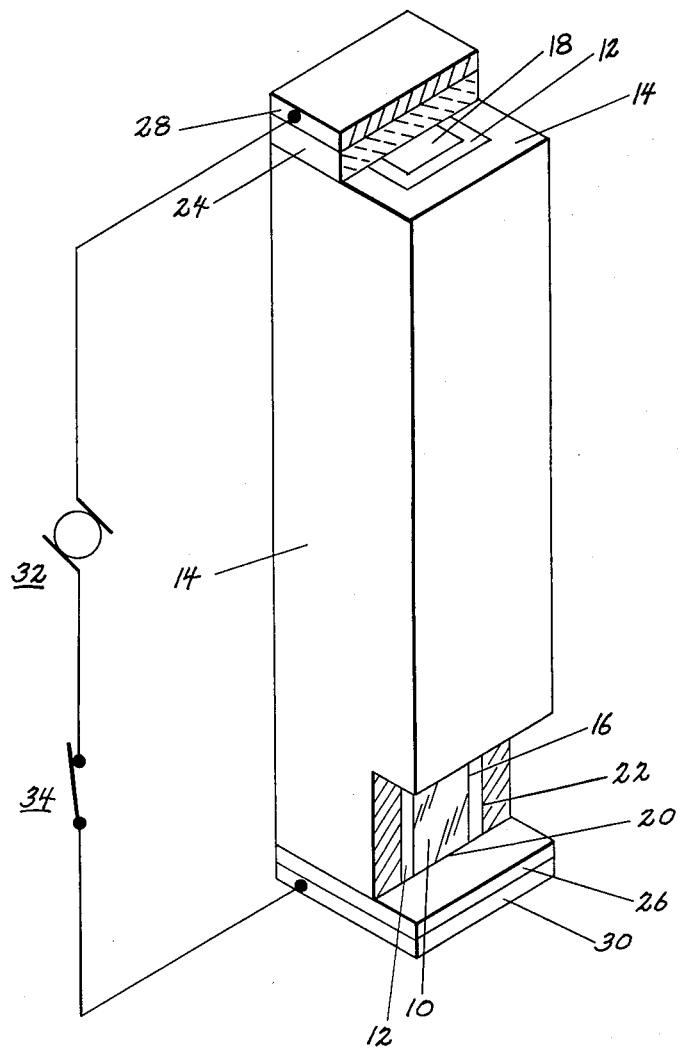
INVENTOR.
Joseph T. McNaney

United States Patent Office 3,091,698
Patented May 28, 1963

3,091,698
PHOTOSENSITIVE LIGHT AMPLIFIER AND
REGENERATIVE ELEMENT
Joseph T. McNaney, 8548 Boulder Drive, La Mesa, Calif.
Filed Aug. 10, 1961, Ser. No. 130,636
6 Claims. (Cl. 250—213)

This invention relates to an improved light amplifier and regenerative element capable of being used in systems for transforming transitory light wave information into less temporary forms of visual displays.

Image storage apparatus of the type in which my improved light regenerative element may be utilized is disclosed in my U.S. Patent 2,976,447. The light regenerative element of the present invention is an improvement over the photoconductor clad 102 glass fiber 101, shown in the aforesaid patent.

The present invention employs the principles of conducting light waves through transparent fibers or filaments, often referred to as light pipes, or, light conducting fibers. These transparent filaments, pipes or fibers operate as light conductors by reflecting light waves from one side to the other, as long as the angle at which light strikes the side of the fiber is greater than the critical angle. Depending upon the fiber material, the critical angle may be as small as 50 degrees. Light conducting materials from which fibers have been made include quartz, glass, Lucite, nylon and like materials. Light conducting fibers have been drawn to diameters of less than 0.001", and such fibers have been capable of conducting light waves with a high degree of efficiency through fiber lengths exceeding 25 feet. The outer surface of these fibers normally contain a fire polish surface, and, when such surfaces are intimately joined with an opaque material considerable light wave energy will be absorbed by this material. And also, when such surfaces are intimately joined with a transparent material having a high index of refraction relative to the index of the fiber, or in an environment having a relatively high index of refraction, light waves will be conducted away from the outer surface of the fiber.

I have discovered, therefore, that opaque materials, when combined with a light conducting fiber for the purpose of developing a cooperative result, must be light insulated from the fire polished surface of the fiber by means of a medium having a relatively low index of refraction.

In the present invention I utilize a light conducting fiber having a relatively high index of refraction, a longitudinal dimension exceeding its cross sectional dimension, an outer surface generally along its longitudinal dimension being fire polished to a smooth surface, and first and second transverse ends. I also utilize an electrical conductor supported by the light conducting fiber for the purpose of developing a cooperative result, which extends from the first to the second transverse end of the fiber. The purpose of the fiber is to permit light waves entering one transverse end to be conducted to the opposite transverse end, and the purpose of the electrical conductor is to provide a relatively low resistance path to the flow of electrical current from one end of the fiber to the opposite end. However, in order to avoid the electrical conductor of interfering with the efficient conduction of light waves from its one end to the other, I utilize a jacket of light conducting material having a relatively low index of refraction between the outer surface of the fiber and the electrical conductor. The jacket is intimately joined with the smooth surface of the fiber. Since a wave train of light being conducted through the fiber by internal reflections will actually penetrate the jacket beyond the interface of the jacket and the fiber a little more than a wavelength before dying away to a negligible amount in electromagnetic field strength, and before turning back into the fiber, the jacket thickness will be equal to at least several microns. The function of the jacket, therefore, will be to insulate the light waves from the electrical conductor which light waves would otherwise be absorbed by the electrical conductor and thereby impair the light conduction ability of the fiber.

The electrical conductor is connected operatively with a layer of photoconductive material adjacent one transverse end of the fiber which is adapted to be illuminated by light waves emanating from within the fiber, or, from a light source external to the fiber. An electroluminescent phosphor layer is supported adjacent the opposite transverse end of the fiber and joined by the electrical conductor. Electrode means are disposed upon respective outer surfaces of the photoconductor layer and the electroluminescent layer, whereby, a potential influence from a source of potential may be presented across the electroluminescent layer upon the exposure of the photoconductive layer to light waves from an external source. Because of the light conducting ability of the fiber, light waves from the electrically energized electroluminescent layer will be used to maintain the photoconductive layer in its low resistance state.

It is therefore an object of the present invention to provide a light regenerative element which is simple in construction, highly stable in its operation, and extremely efficient as a light feed-back element.

It is therefore a further object of the invention to provide an improved light regenerative element for use in the fabrication of information display panels.

Other objects and advantages of the invention will become apparent from the following description when read in conjunction with the accompanying drawing wherein a view in perspective of the invention is shown, with certain portions cut away to show its inner construction.

Referring now to the drawing, a unitary element comprising the basic concepts of my invention is shown to include a light conducting fiber 10, a jacket 12 of light conducting material and an electrical conductor 14. The light conducting fiber 10 has a relatively high index of refraction, a longitudinal dimension exceeding its cross sectional dimension, an outer surface 16 generally along its longitudinal dimension and which surface 16 is, for example, fire polished to a smooth surface, and first and second transverse ends 18 and 20. The cross sectional shape of the fiber 10, although shown to be rectangular, may be round, hexagonal, octagonal, or of any other cross sectional shape. The jacket 12 of light conducting material has a relatively low index of refraction, intimately joined with and surrounding the outer surface 16, forming an interface at and along the juncture 16. The thickness dimension of the jacket is in excess of two microns. The electrical conductor 14 is disposed upon the outer surface 22 of the jacket 12, extending from the first transverse end 18 to the second transverse end 20 of the fiber 10. The low refractive index of the jacket 12 and its thickness dimension being in excess of two microns, permits the jacket 12 to insulate the light waves being conducted through the fiber 10 from the electrical conductor 14. The light waves thereby insulated from the conductor 14 by the jacket 12 will, instead of being absorbed by the conductor 14 if it were not for the presence of the jacket 12, be conducted through the fiber 10 by the light reflecting capabilities of the jacket 12.

An electroluminescent layer 24 containing electroluminescent phosphor particles in a dielectric media is disposed on the first end 18 of the fiber 10 and joined by the electrical conductor. A layer of photoconductive material 26 is disposed upon the second end 20 of the fiber 10 and connected operatively with the electrical conductor 14. A first electrode 28 is disposed upon the outer surface of the electroluminescent layer 24, and a second electrode 30 is disposed upon and connected operatively with the outer surface of the photoconductor layer 26. The photoconductor layer 26 may be of such materials as selenium, cadmium sulphide, silver selenide, germanium, or like materials. The first and second electrodes 28 and 30 are preferably of light transparent material. An example of a well known material that may be used for this purpose is a conductive material produced by Pittsburgh Plate Glass Company, under the trademark "NESA" transparent conductive material.

Upon the exposure of transitory light radiation to the outer surface of the photoconductive layer 26 the latter will have been converted from a dark resistance state to an illuminated resistance state, or, from a high electrical resistance to a relatively low electrical resistance. Under these conditions the potential influence of a source of potential 32 will be presented across the electroluminescent layer 24 between the electrical conductor 14 and the first electrode 28, causing the layer 24 to generate secondary light waves which will be conducted back to the photoconductive layer 26 to maintain the latter in a low resistance state. This regenerative action will keep the electroluminescent layer 24 in an energized, or "on," condition until the potential influence of the potential source 32 has been interrupted by the opening of a switch means 34.

The light regenerative element of this invention will be recognized by those skilled in the art as a very useful device in the design and development of logic networks, and also in the fabrication of image display panels. It will be found that this invention lends itself to various computer circuitry applications such as read-in, storage, and read-out circuits, flip-flop circuits, shift registers, etc.

It should, of course, be understood that many other embodiments embracing the general principles and construction hereinbefore set forth, may be utilized and still be within the ambit of the present invention.

The particular embodiment of the invention illustrated and described herein is illustrative only, and the invention includes such other modifications and equivalents as may be readily noted by those skilled in the arts, and within the scope of the appended claims.

I claim:

1. A light radiation sensitive light regenerative storage element comprising:
   (a) an electroluminescent layer having first and second surfaces on opposite sides thereof;
   (b) a photoconductive layer having first and second surfaces on opposite sides thereof;
   (c) a first light transparent electrode intimately joined with said second surface of said electroluminescent layer;
   (d) a second light transparent electrode intimately joined with said second surface of said photoconductive layer;
   (e) a tube of electrically conductive material having first and second ends; and
   (f) a light conducting fiber within said tube having a predetermined index of refraction, a first end extending to said first end of said tube for supporting said electroluminescent layer, a second end extending to said second end of said tube for supporting said photoconductive layer, and means for conducting light from said electroluminescent layer to said photoconductive layer;
   (g) said last stated means including a light conducting material jacketing said fiber having an index of refraction less than said predetermined index for controlling the reflection of light through said fiber to said photoconductive layer and for light insulating said fiber from said tube;
   (h) said first surface of said electroluminescent layer being optically coupled with the entire first end of said fiber and connected operatively with the entire first end of said tube;
   (i) said first surface of said photoconductive layer being optically coupled with the entire second end of said fiber and connected operatively with the entire second end of said tube.

2. A light radiation sensitive light regenerative storage element comprising:
   (a) an electroluminescent layer having first and second surfaces on opposite sides thereof;
   (b) a photoconductive layer having first and second surfaces on opposite sides thereof;
   (c) a first light transparent electrode intimately joined with said second surface of said electroluminescent layer;
   (d) a second light transparent electrode intimately joined with said second surface of said photoconductive layer;
   (e) a longitudinally extending tube of electrically conductive material having first and second end surfaces;
   (f) said first end surface of said tube connected operatively with said first surface of said electroluminescent layer;
   (g) said second end surfaces of said tube connected operatively with said first surface of said photoconductive layer;
   (h) means for presenting the influence of an electrical potential between said first and second electrodes;
   (i) said photoconductive layer being adapted to receive light through said second light transparent electrode to thereby extend the influence of said potential across said electroluminescent layer; and
   (j) optical fiber means for conducting light from said electroluminescent layer through said longitudinally extending tube of electrically conductive material to said photoconductive layer.

3. A light radiation sensitive light regenerative storage element comprising:
   (a) a longitudinally extending tubular electrical conductor having first and second transverse ends;
   (b) a first light transparent electrically conductive window spaced apart from said first transverse end of said conductor;
   (c) a second light transparent electrically conductive window spaced apart from said second transverse end of said conductor;
   (d) an electroluminescent layer intermediate said first window and said first transverse end of said conductor;
   (e) a photoconductor layer intermediate said second window and said second transverse end of said conductor;
   (f) an optical fiber within said tubular electrical conductor extending from said first transverse end to said second transverse end of said conductor; and
   (g) light reflector means intermediate said fiber and said electrical conductor for light insulating said fiber from said conductor and controlling by internal reflections the conduction of light through said fiber from said electroluminescent layer to said photoconductor layer.

4. Means for utilization in an image storage apparatus comprising:
   (a) a longitudinally extending tubular electrical conductor having a first end surface normal to its longitudinal dimension and a second end surface normal to its longitudinal dimension;
   (b) a first light transparent electrically conductive window directly opposite and spaced apart from said first end surface of said conductor and substantially parallel with said first end surface;
   (c) a second light transparent electrically conductive window directly opposite and spaced apart from said second end surface of said conductor and substantially parallel with said second end surface;

(d) an electroluminescent layer intermediate said first window and said first end surface of said conductor and intimately joined therewith;

(e) a photoconductor layer intermediate said second window and said second end surface of said conductor and connected operatively therewith;

(f) a first light conductor means having a predetermined index of refraction supported within said tubular conductor extending from said first end surface to said second end surface of said tubular conductor; and (g) a second light conductor means having an index of refraction less than said predetermined index intermediate said first light conductor means and said tubular conductor and intimately joined therewith;

(h) said second light conductor means being adapted to light insulate said first light conductor means from said tubular conductor and reflect light waves through said first light conductor means from said electroluminescent layer to said photoconductor layer.

5. Means for utilization in an image storage apparatus comprising:

(a) a tubular electrical conductor having a longitudinal dimension exceeding its cross sectional dimension, a first end surface normal to said longitudinal dimension and coincident with a first plane, and a second end surface normal to said longitudinal dimension and coincident with a second plane;

(b) an electroluminescent layer intimately joined with said tubular conductor coincident with said first plane, extending to the limits of the cross sectional dimension of said tubular conductor, and presenting an outer surface substantially parallel with said first plane;

(c) a photoconductive layer connected operatively with said tubular conductor coincident with said second plane, extending to the limits of the cross sectional dimension of said tubular conductor, and presenting an outer surface substantially parallel with said second plane;

(d) a first light transparent electrically conductive window intimately joined with said outer surface of said electroluminescent layer and extending to the limits of the cross sectional dimension of said tubular conductor;

(e) a second light transparent electrically conductive window intimately joined with said outer surface of said photoconductive layer and extending to the limits of the cross sectional dimension of said tubular conductor;

(f) a first light conductor means within said tubular conductor having a predetermined index of refraction, a first end surface extending to and coinciding with said first plane, and a second end surface extending to and coinciding with said second plane; and (g) a second light conductor means intermediate said first light conductor means and said tubular conductor and intimately joined therewith.

6. Means for utilization in an image storage apparatus comprising:

(a) an electroluminescent layer having first and second surfaces on opposite sides thereof;

(b) a photoconductor layer having first and second surfaces on opposite sides thereof;

(c) a first light transparent electrically conductive window intimately joined with said second surface of said electroluminescent layer;

(d) a second light transparent electrically conductive window intimately joined with said second surface of said photoconductor layer;

(e) a longitudinally extending electrically conducting tube having a first end surface coincident with a first plane and a second end surface coincident with a second plane;

(f) said first surface of said electroluminescent layer being parallel and intimately joined with said first end surface of said tube coincident with said first plane;

(g) said first surface of said photoconductor layer being parallel and intimately joined with said second end surface of said tube coincident with said second plane; and (h) optical fiber means within said tube for conducting light from said electroluminescent layer to said photoconductor layer upon the exposure of light to said photoconductor layer through said second light transparent electrically conductive window.

References Cited in the file of this patent

UNITED STATES PATENTS

| 2,964,640 | Wippler | Dec. 13, 1960 |
| 2,976,447 | McNaney | Mar. 21, 1961 |
| 2,999,941 | Klasens et al. | Sept. 12, 1961 |
| 3,035,178 | Stone | May 15, 1962 |
| 3,043,179 | Dunn | July 10, 1962 |
| 3,047,867 | McNaney | July 31, 1962 |
| 3,056,031 | McNaney | Sept. 25, 1962 |